United States Patent
Colmenarez et al.

(10) Patent No.: US 6,999,613 B2
(45) Date of Patent: Feb. 14, 2006

(54) VIDEO MONITORING AND SURVEILLANCE SYSTEMS CAPABLE OF HANDLING ASYNCHRONOUSLY MULTIPLEXED VIDEO

(75) Inventors: Antonio J. Colmenarez, Maracaibo (VE); Srinivas Gutta, Yorktown Heights, NY (US); Miroslav Trajkovic, Ossining, NY (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 431 days.

(21) Appl. No.: 10/034,670

(22) Filed: Dec. 28, 2001

(65) Prior Publication Data

US 2003/0123702 A1    Jul. 3, 2003

(51) Int. Cl.
*G06K 9/62* (2006.01)
(52) U.S. Cl. .................. 382/156; 382/224; 348/153
(58) Field of Classification Search ............... 348/143, 348/152–155, 159, 207.99, 211.5, 208.16, 348/211.11, 211.14; 382/103, 168, 155–160, 382/118, 224, 225; 340/5.8–5.83, 5.52, 5.53
See application file for complete search history.

(56) References Cited

U.S. PATENT DOCUMENTS

| | | | | |
|---|---|---|---|---|
| 5,243,418 A | * | 9/1993 | Kuno et al. ................. | 348/155 |
| 6,317,160 B1 | * | 11/2001 | Yoshida et al. ............. | 348/473 |
| 6,751,354 B2 | * | 6/2004 | Foote et al. ................ | 382/224 |
| 6,801,656 B1 | * | 10/2004 | Colmenarez et al. ....... | 382/159 |
| 2002/0039203 A1 | * | 4/2002 | Endo et al. ................. | 358/462 |
| 2002/0141637 A1 | * | 10/2002 | Brodsky et al. ............ | 382/165 |
| 2002/0168106 A1 | * | 11/2002 | Trajkovic ................... | 382/170 |

* cited by examiner

*Primary Examiner*—Jingge Wu
*Assistant Examiner*—Ashutosh Upreti
(74) *Attorney, Agent, or Firm*—Edward W. Goodman

(57) ABSTRACT

Aspects of the present invention can be configured to demultiplex an asynchronously multiplexed video signal, which comprises images from a number of different cameras. Image matching techniques are used to assign input images with states. After a period, the number of states will generally equal the number of input cameras. The states may be modeled through any number of techniques, such as histogram analysis, clustering, and hidden Markov model analysis. Input images are assigned to states, and the input images are output as being associated with the states. Zone surveillance may be performed on a series of images from one or more of the states. Any events that occur can be distinguished and reported.

14 Claims, 5 Drawing Sheets

VIDEO MONITORING AND SURVEILLANCE SYSTEMS CAPABLE OF HANDLING ASYNCHRONOUSLY MULTIPLEXED VIDEO

FIELD OF THE INVENTION

The present invention relates to video surveillance systems, and more particularly, to video monitoring and surveillance systems capable of handling asynchronously multiplexed video from multiple cameras.

BACKGROUND OF THE INVENTION

Computer vision monitoring and surveillance systems are typically implemented using algorithms that can handle images from a single camera. In these systems, video from one camera is fed into a video surveillance system, which uses a computer vision algorithm to determine events in the video images. Such events, for example, could include unauthorized personnel in an area, a queue that is too long, a door left open, lights left on, or smoke.

There are also multi-camera computer-vision based monitoring systems. These multi-camera setups require either (i) multiple video inputs, which are handled independently, or (ii) a computer-controllable multiplexer to individually select, among the various cameras, the video input feed to be sent to the algorithm at any given time. Generally, frame-accurate multiplexers (called "synchronous" multiplexers herein) that can be controlled by computer are significantly more expensive than those that switch from one camera to the next asynchronously.

However, asynchronous video multiplexers present a problem in that their switching is not known beforehand. In other words, a synchronous video multiplexer will switch from camera to camera in manner that can be determined before the multiplexer begins to switch or that can be set through the use of a computer interface. An asynchronous video multiplexer will not switch from camera to camera in a known manner and is generally not programmable. When a video monitoring system is staffed by an operator, then using an asynchronous multiplexer is not a significant detriment, because the operator can determine which room is being displayed by a video display, even when the display only shows a predetermined number of frames of video from one camera of the multiplexed stream of video. It is also relatively easy for an operator to determine what events are occurring in each room.

Conversely, current computer vision algorithms do not analyze video from an asynchronous video multiplexer. Consequently, a need exists for video monitoring and surveillance systems that allow the use of asynchronous video multiplexers and yet still adequately monitor events on each of a number of camera feeds.

SUMMARY OF THE INVENTION

Generally, the present invention provides video monitoring and surveillance systems capable of handling asynchronously multiplexed video from multiple cameras. Aspects of the present invention can be configured to demultiplex an asynchronously multiplexed video signal, which comprises images from a number of different cameras.

In one aspect of the invention, an input image is accepted and compared with a number of states. The input image is from a signal comprising a number of images from a number of different cameras. The image is assigned to a state when the input image matches the state. Generally, matching is performed by creating input image information from the input image and comparing the input image information with state image information from each of the states. The states may be modeled through any number of known techniques, such as Hidden Markov Models, histograms, or clustering.

In a second aspect of the invention, each input image is determined from an asynchronously multiplexed video signal. In this aspect, each state should, after an amount of time, correspond to an input camera. Each input image should match a state, and the state to which an input image belongs should be determined. Once an input image is matched to a state, the input image can be assigned to that state and output as belonging to this state. Consequently, a camera can be selected at random and an image from the selected camera can be assigned to a state. Because the state corresponds to the selected camera, the image is demultiplexed from the asynchronously multiplexed video signal, and this demultiplexing occurs without prior knowledge of how the images are placed on the asynchronously multiplexed video signal.

In a third aspect of the invention, the various output images are analyzed to determine zone events for each state. After some period of time, the zone events should be specific to input cameras. Such events can include emergency events, such as fire or smoke, unauthorized entry, and queue management.

In a fourth aspect of the invention, new states are added as images are input that do not match currently existing states. Consequently, this aspect of the present invention can start with no states and will, over time, develop a number of states. The number of states should, after a time, equal the number of input cameras. Additionally, states may be deleted.

In a fifth aspect of the invention, the states are modeled through a Hidden Markov Model (HMM). The HMM not only allows states to be determined, but also allows transitions between the states to be determined. After a training period, the HMM should create one state per input camera, and also should create transitions between states. The transitions model how an asynchronous video multiplexer is switching between cameras and may be used to better estimate to which camera an input image belongs.

A more complete understanding of the present invention, as well as further features and advantages of the present invention, will be obtained by reference to the following detailed description and drawings.

DETAILED DESCRIPTION

Figure 1:
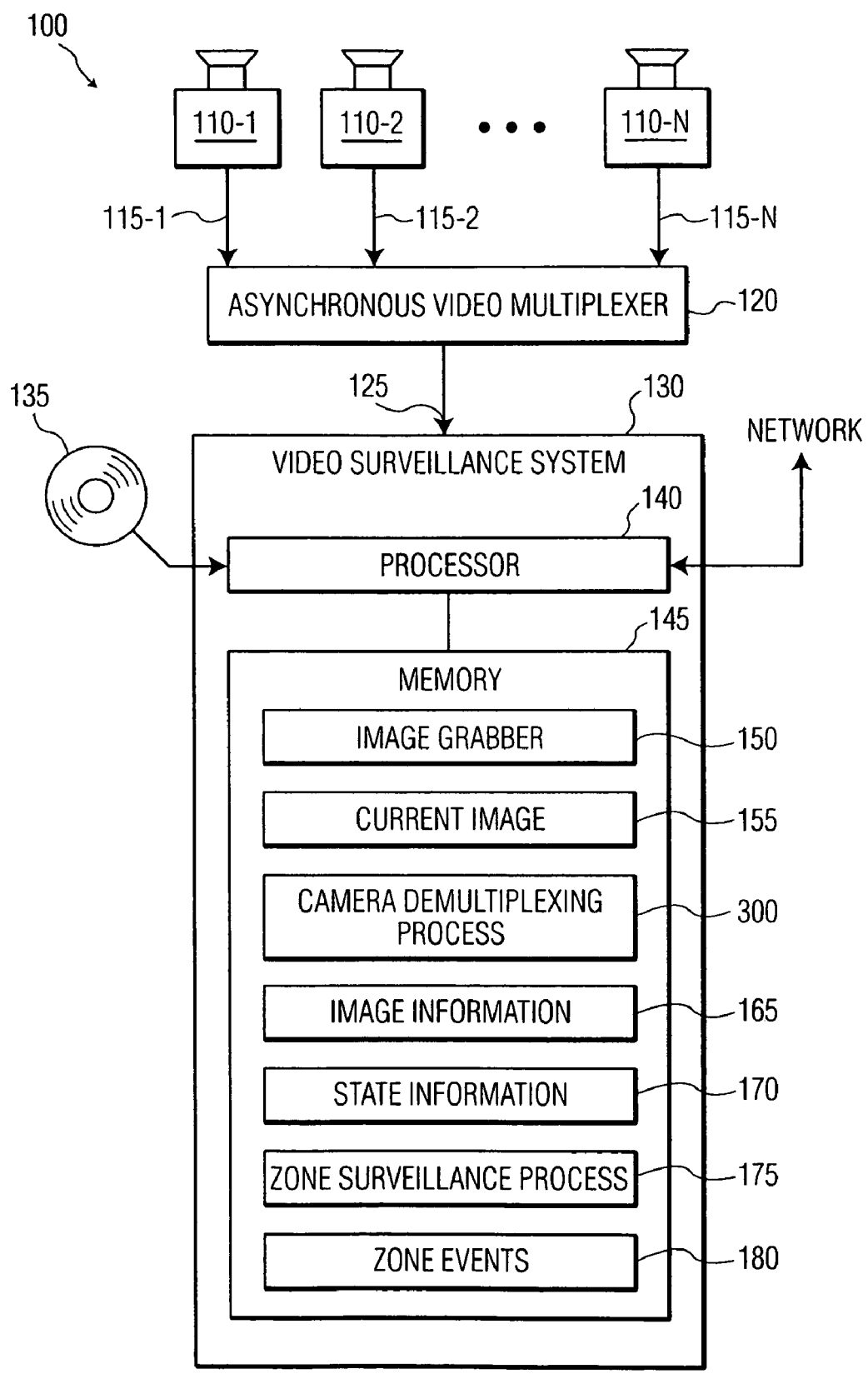
FIG. 1 illustrates an exemplary video monitoring system in accordance with a preferred embodiment of the invention.

Referring now to FIG. 1, a block diagram of an exemplary video monitoring system 100 is shown operating in accordance with a preferred embodiment of the invention. The video monitoring system 100 comprises cameras 110-1 through 110-N (collectively, "cameras 110"), camera feeds 115-1 through 115-N (collectively, "camera feeds 115"), and asynchronous video multiplexer 120, a multiplexed camera output 125, and a video surveillance system 130. Video surveillance system 130 is shown interacting with a Digital Versatile Disk (DVD) 135 and a network.

Video surveillance system 130 comprises a processor 140 and a memory 145. Memory 145 comprises an image grabber 145, a current image 155, a camera demultiplexing process 300, image information 165, state information 170, a zone surveillance process 175, and zone events 180.

Asynchronous video multiplexer 120 is a video multiplexer that asynchronously switches between cameras 110 and their associated camera feeds 115. By "asynchronous," it is meant that the order in which asynchronous video multiplexer 120 switches between cameras 110 is not known nor can the order be programmed. The asynchronous video multiplexer 120 produces a multiplexed camera output 125, which comprises images from camera feeds 115. It is expected that the asynchronous video multiplexer 120 will switch between camera feeds 115 so that complete images (or frames) are taken from each camera. However, this is not required.

The asynchronous video multiplexer 120 thus produces a video stream (i.e., multiplexed camera output 125) having a number of images from different cameras 110. These images are not in a predetermined order. For example, asynchronous video multiplexer 120 could be used in a system 100 having four cameras (i.e., N is four). During a certain period of time, the asynchronous video multiplexer 120 could select images from cameras 110-1, 110-4, 110-2, 110-1, 110-4, 110-3, and 110-1, in this order. During a different period of time, where the two periods of time could be the same length, the asynchronous video multiplexer 120 could select images from cameras 110-4, 110-3, 110-2, 110-1, and 110-4.

Aspects of the present invention take into account the limited knowledge of how the asynchronous video multiplexer 120 will switch between cameras. Instead of needing a complete description of when camera switching will occur and how long the multiplexer will remain on the camera, the present invention determines this description by creating and refining a number of states and assigning images to those states. Once the present invention is trained for a while, the present invention should create one state for each camera, if each camera is on and viewing a location with an appropriate amount of light. Thus, regardless of how the multiplexer 120 switches, the present invention should be able to demultiplex a multiplexed video signal into separate camera views.

One way to start the process of demultiplexing is by working with a single image from a single camera. The image grabber 150 grabs one image from multiplexed camera output 125, through techniques known to those skilled in the art. The image grabber grabs a single image, and makes this image available to the camera demultiplexing process 300 as current image 155. Image grabber 150 can also convert analog video into digital images, if this step has not already been performed elsewhere.

Camera demultiplexing process 300 extracts image information 165 from the current image 155. Broadly, the camera demultiplexing process 300 uses image matching techniques to match current image 155 with stored images, where each stored image corresponds to a state. For example, the camera demultiplexing process 300 compares, using image matching techniques that are described in more detail below, the current image 155 with image information for each of a number of states stored in state information 170. If there is a match, the current image 155 is assigned to the matching state, and the camera demultiplexing process 300 outputs the current image 155 as coming from the matching state.

The zone surveillance process 175 then determines to which zone the state belongs and processes the current image 155. It should be noted that zone surveillance process 175 may operate on the image information 165 instead of or in conjunction with the current image 155. The zone surveillance process 175 can determine, for instance, how many people are in a queue (such as a bank teller line), whether lights are left on or off, whether one or more people are in an unauthorized area, or whether there is smoke or fire. The zone surveillance process 175 can be configured to produce zone events 180, which comprise the warnings of danger, indications of anomalies, queue size or alarms related thereto, or other information.

The zone surveillance process 175 can be tuned by an operator to adjust outputs of the camera demultiplexing process 300 to better fit the cameras 110. This is explained in more detail in reference to FIG. 2.

As previously discussed, the camera demultiplexing process 300 uses image matching techniques to match the current image 155 with images associated with states in the state information 170. While the images themselves could be used for comparison, generally most, if not all, image matching methods extract information from the images and use the extracted information for matching.

For instance, one relatively simple technique for image matching uses histograms. A histogram is a count of how many pixels are particular values. Simple histograms use greyscale, which is a two-dimensional representation of the image. More complex histograms use three or more dimensions, such as using a Hue, Saturation, and Intensity (HSI) histogram. For histogram-based processes, the image information 165 will be a histogram. This histogram is compared with other histograms in state information 170, where each state has associated with it at least one histogram. A match is determined if the histograms are similar, as determined by a metric. One possible metric is the histogram intersection metric, as explained in more detail in M. Swain and D. Ballard, "Color Indexing," International Journal Computer Vision 7:1, 11–32 (1991), the disclosure of which is hereby incorporated by reference. An exemplary state diagram is described in reference to FIG. 4 and an exemplary state information memory 170 is described in reference to FIG. 5.

If there is no match between the current image 155 and a state in state information 170, the camera demultiplexing process 300 can create a new state and store image information 165 for the new state. Additional features of the camera demultiplexing process 300 are described below.

Additional matching methods may be used. For instance, many image processing systems determine features of the image. Such features include Discrete Cosine Transforms (DCTs) and coefficients therefrom, means of pixel values, covariances, and other mathematical devices. Additionally, the images may be examined for unique aspects. For example, one camera may be viewing a room that has a number of corners, paintings, televisions, or other visually significant items. These areas may be used to differentiate between images.

Once the features are determined, then image information 165 will describe these features. The features from the current image 155 are compared with stored features in each of a number of states in state information 170. The different features define a feature space. One technique for determining how to divide the feature space into orderly segments is called clustering. In clustering, certain classes are determined from many sets of features. These classes may be used as the states herein. Once the classes are determined, then an unknown set of features may be assigned to one of the classes, or other classes may be created.

Another technique that generally uses feature spaces is Hidden Markov Models (HMMs). An HMM comprises states, and the states are determined through probability. Moreover, HMMs generally also comprise transitions between each state. An introduction to pattern recognition, which includes clustering and HMMs, is given in Donald O. Tanguay, "Hidden Markov Models for Gesture Recognition," (1995) (unpublished Ph.D. thesis, Massachusetts Institute of Technology), the disclosure of which is hereby incorporated by reference. A benefit of HMMs is that these models not only provide clustering but also provide transitions that relate the clusters.

It should be noted that the video surveillance system 130 need not comprise each device shown in memory 150. For example, the image grabber 150 could be a stand-alone device that feeds a current image 155 to the video surveillance system 130. Similarly, the zone surveillance process 175 and zone information 180 can also be separate from the video surveillance system 130. The video surveillance system 130 and video monitoring system 100 shown in FIG. 1 are merely exemplary.

As is known in the art, the methods and apparatus discussed herein may be distributed as an article of manufacture that itself comprises a computer readable medium having computer readable code means embodied thereon. The computer readable program code means is operable, in conjunction with a computer system such as video monitoring system 100, to carry out all or some of the steps to perform the methods or create the apparatuses discussed herein. The computer readable medium may be a recordable medium (e.g., floppy disks, hard drives, compact disks such as DVD 135, or memory cards) or may be a transmission medium (e.g., a network comprising fiber-optics, the worldwide web, cables, or a wireless channel using time-division multiple access, code-division multiple access, or other radio-frequency channel). Any medium known or developed that can store information suitable for use with a computer system may be used. The computer-readable code means is any mechanism for allowing a computer to read instructions and data, such as magnetic variations on a magnetic media or height variations on the surface of a compact disk, such as DVD 135.

Memory 145 will configure the processor 140 to implement the methods, steps, and functions disclosed herein. The memory 145 could be distributed or local and the processor 140 could be distributed or singular. The memory 145 could be implemented as an electrical, magnetic or optical memory, or any combination of these or other types of storage devices. The term "memory" should be construed broadly enough to encompass any information able to be read from or written to an address in the addressable space accessed by processor 140. With this definition, information on a network is still within memory 145 of the video monitoring system 100 because the processor 145 can retrieve the information from the network. It should also be noted that all or portions of video monitoring system 100 may be made into an integrated circuit or other similar device, such as a programmable logic circuit.

Figure 2:
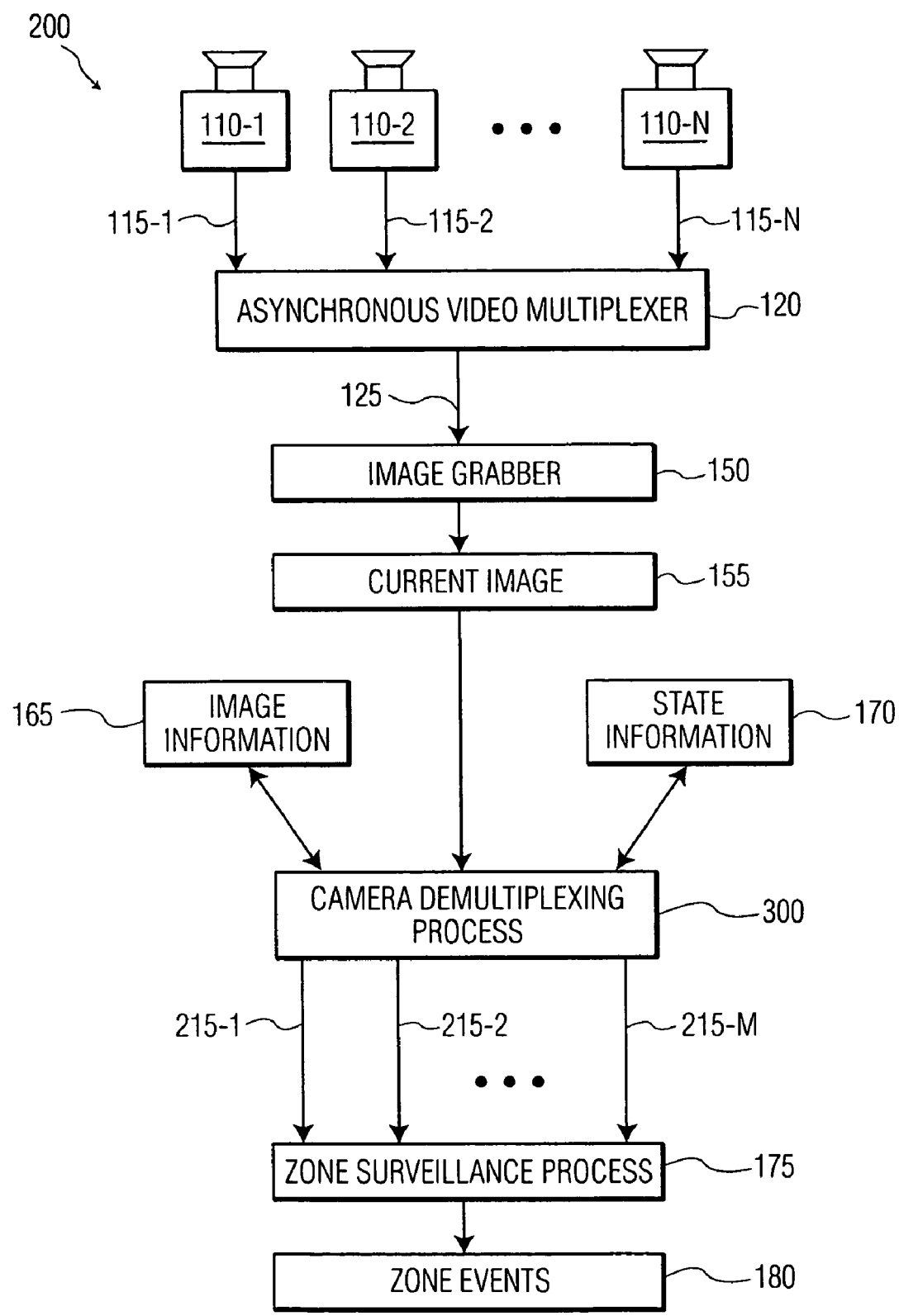
FIG. 2 is a structural block diagram of the exemplary video monitoring system of FIG. 1, shown operating in accordance with a preferred embodiment of the invention.

Referring now to FIG. 2, a structural block diagram 200 of the exemplary video monitoring system 100 of FIG. 1 is shown operating in accordance with a preferred embodiment of the invention. Each camera 110 produces a camera feed 115, which feeds into asynchronous video multiplexer 120. The asynchronous video multiplexer 120 then multiplexes images from each camera onto the multiplexed camera output 125. The images are multiplexed asynchronously, so that the sequence of sampling camera feeds 115 and capturing images from these feeds is not known beforehand.

The image grabber 150 determines single images from the multiplexed camera output 125. It should be noted that the image grabber 150 can ignore partial images from asynchronous video multiplexer 120, should the asynchronous video multiplexer 120 create partial images. Alternatively, partial images that have a predetermined number of active pixels may be placed in a current image memory location. In the examples of FIGS. 1 and 2, the current image 155 is created by image grabber 150.

The camera demultiplexing process 300 processes current image 155 and creates, from the current image 155, image information 165. As described above and in more detail below, the image information can be histogram information or a number of features, such as a number of Discrete Cosine Transform (DCT) coefficients, a mean, a covariance, and other features known to those skilled in the art.

Figure 4:
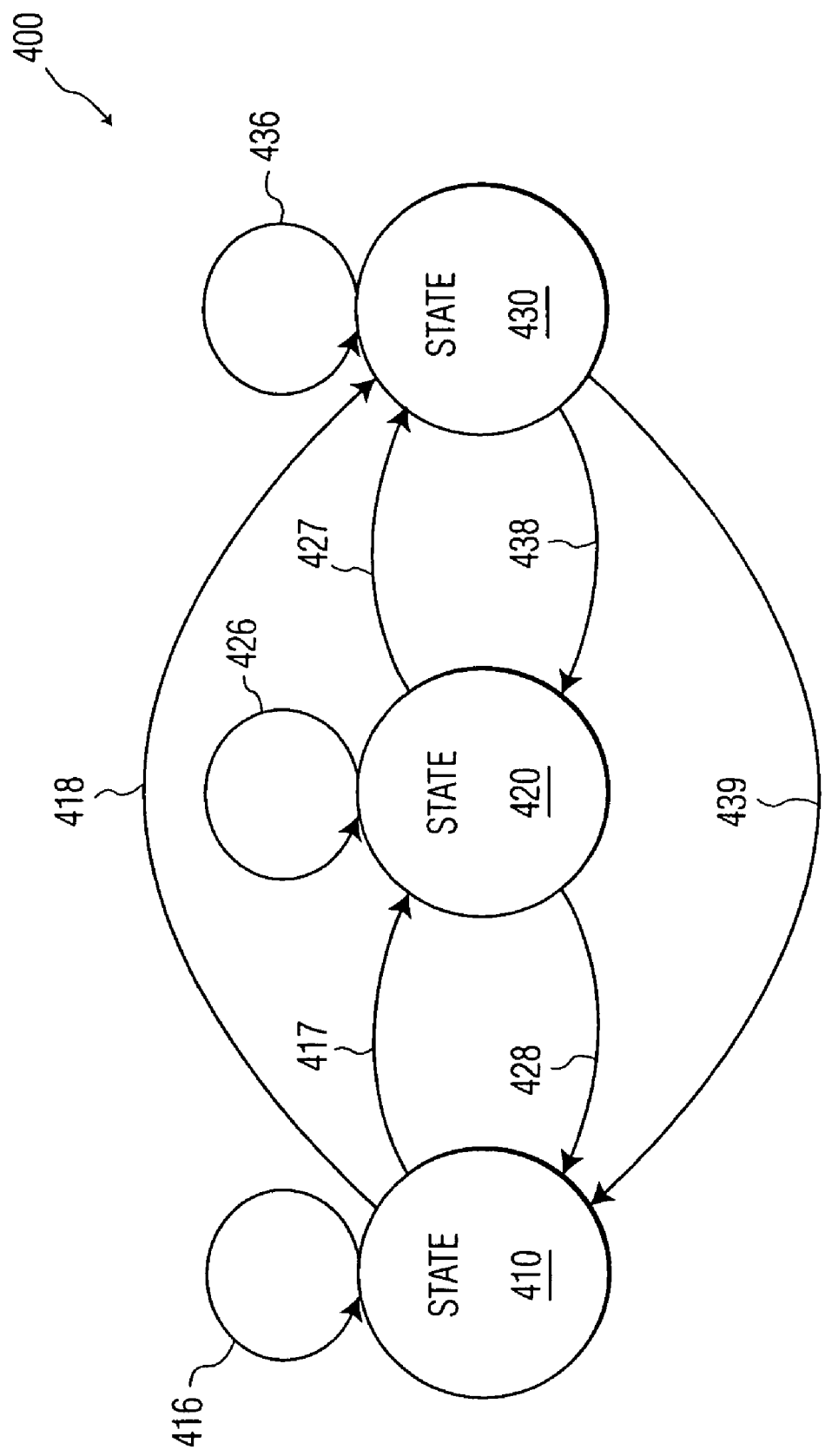
FIG. 4 is an exemplary state diagram that models camera views, in accordance with a preferred embodiment of the invention.

The camera demultiplexing process 300 also controls and determines state information 170, a structural example of which is described in reference to FIG. 4. State information 170 generally contains a number of states, and each state has its own image information. The camera demultiplexing process 300 compares image information 165 with the image information for each of the states in the state information 170, and determines if there is a match. If there is a match, the current image is assigned to the particular state and is output as belonging to that state. In the example of FIG. 2, the camera demultiplexing process 300 produces outputs 215-1 through 215-M (collectively, "215"). Each output corresponds to a state. Thus, if the current image 155 is assigned to state two, for example, the current image 155 will be output on output 215-2.

If the current image 155 does not correspond to any state, then the image information 165 is used to create an additional state in state information 170 and to create an additional output 215.

It is expected that, over time, the number of outputs 215 (i.e., M) will equal the number of camera feeds 115 (i.e., N). However, this may not be the case in certain situations. For example, if two cameras view different pitch black areas, the images from these two cameras may be combined into one state.

The zone surveillance process 175 examines each output 215 for zone events 180. Such events 180 can include queue lengths, warnings of unauthorized personnel in certain areas, and lights left on or off. The zone surveillance process 175 may also include a mapping from states to cameras 110. For instance, an operator could determine that state two belongs to camera five and program the zone surveillance process 175 to label images assigned to state two as being from camera five. Additionally, the zone surveillance process 175 can simply switch to and display images from the state or state having zone events on them. This would allow an operator to determine which camera 110, and consequently which zone, is having a zone event.

Figure 3:
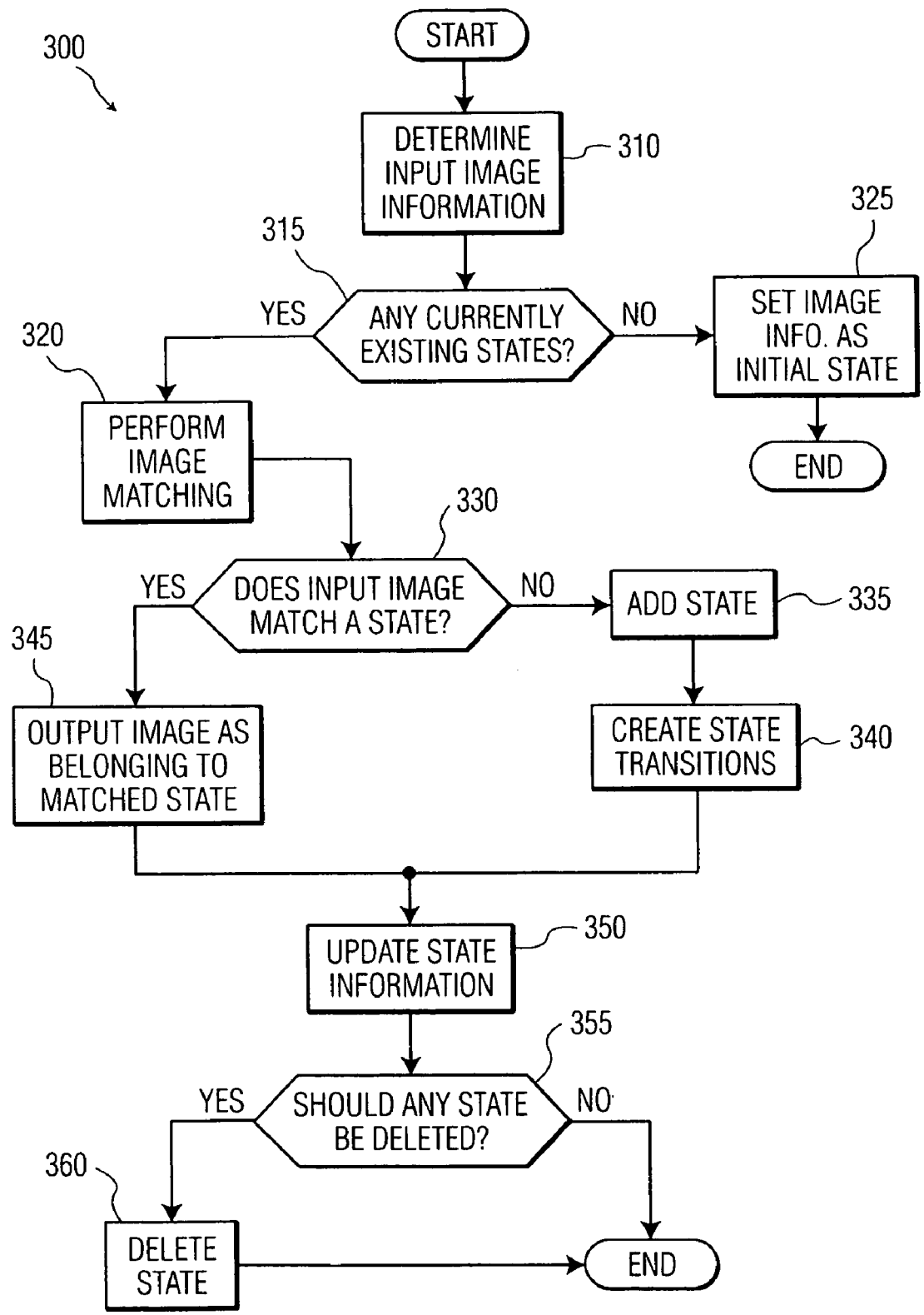
FIG. 3 is a flow chart describing an exemplary method for camera demultiplexing, in accordance with a preferred embodiment of the invention.

Referring now to FIG. 3, a method 300 for camera demultiplexing is shown, in accordance with a preferred embodiment of the invention. Method 300 is used by a system in order to demultiplex a multiplexed camera signal, where the multiplexed camera signal contains images from a variety of cameras. The multiplexed camera signal could contain a series of images that are synchronously determined from cameras. This means that the camera rotation schedule and time spent viewing each camera is known. Generally, however, the multiplexed camera signal will contain a series of images that are asynchronously determined from cameras. This means that either the camera rotation schedule or the time spent viewing each camera or both are not known. Method 300 attempts to recreate each camera feed from the multiplexed camera signal.

Method 300 begins in step 310, when input image information is determined from an input image. The input image information may be histogram data. The input image information may be features such as DCT coefficients, mean values, covariance measurements, or other features as known to those skilled in the art. Feature extraction for describing tennis player motion is discussed in Petkovic et al., "Recognizing Strokes in Tennis Videos Using Hidden Markov Models," Int'l Conf. on Visualization, Imaging and Image Proc., Marbella, Spain (September 2001), the disclosure of which is hereby incorporated by reference. Another possible feature extraction is a compressed chromaticity signature for each image. A reference that describes using compressed chromaticity signatures to represent frames of video data is Lu et al., "Classification of Summarized Video using Hidden Markov Models on Compressed Chromaticity Signatures," ACM Multimedia, Ottawa, Canada, (September–October 2001), the disclosure of which is hereby incorporated by reference.

In step 315, it is determined if there are any currently existing states. If there are no currently existing states (step 315=NO), then the image information is associated with an initial state and an initial state is created (step 325). The method then ends until the next image is ready for analysis.

If there are currently existing states (step 315=YES), then image matching is performed through known techniques. For example, a histogram can be determined (step 310) as the input image information. This histogram may then be compared (step 320) with other stored histograms of the various states to determine a match.

If clustering is used, then the input image information will generally be a predetermined number of features. These features are usually placed into a vector called a feature vector. Clustering generally involves determining where in a feature space a particular cluster resides. In other words, some amount of the feature space will be assigned to a cluster. If the features of the input image place it into this amount of the feature space, then the input image will be assigned to this cluster.

For instance, if there are two features, then the feature space will be a plane. A cluster will be assigned to a certain area of the plane. Values of the two features will be determined for the input image and used as the input image information. Basically, a dot is placed on the plane at a location described by the two features. If the dot is within the area assigned to the cluster, then the image is assigned to this particular cluster. Determining how much of a feature space is assigned to a cluster and where the clusters are located is usually called clustering, while associating an unknown vector with a cluster is generally called classification.

There are a number of techniques used for determining clusters, such as the K-means algorithm. The K-means algorithm is discussed in more detail in Tanguay, which has been incorporated by reference above. Generally, during training, some type of metric is used to determine which feature vectors should be clustered together to create a particular cluster.

Another technique suitable for image matching is using HMMs. Generally, HMMs can use similar techniques to clustering. In fact, HMMs are often used for clustering and classification. Thus, feature vectors can be used for both clustering and HMMs. However, a basis of HMMs is probability, while the basis for clustering is generally means or distance measures. For instance, a state in an HMM models the probability that an event (such as a particular feature vector) occurs. Transition probabilities model how probable a transition from one state to another is. An exemplary HMM is shown in reference to FIG. 4.

In step 330, it is determined if the input image matches a state. This step depends on how images are represented. If histograms are used, then a suitable metric is determined by comparing histograms between the input image information and the image information for each of the states and finding a state histogram that, when its individual values are compared with individual values of the input image histogram, results in an error that is within a predetermined value. Clustering and HMMs can use similar metrics based on feature vectors, as is known in the art.

If input image matches a state (step 330=YES), then the image is assigned to the state and output as being assigned to the state (step 345). On the other hand, if the input image does not match a state (step 335=NO), then a new state is added (step 335), using the input image information. Clustering information, such as the area of the feature space assigned to the new cluster, can be assigned at this point. Additionally, any other necessary information can be initialized and assigned.

If HMMs are being used, then state transitions are created for the new state (step 340). These transitions can be assigned values during step 340.

Step 350 is performed if either step 345 or step 340 has been performed. State information is updated in step 350. For example, transition probabilities can be updated in this step, as can state probabilities. For clustering, further definition of the cluster can be provided by using the latest feature vector. For instance, a cluster may be represented by a multi-dimensional Gaussian distribution, which has a mean and a covariance. The mean and the covariance can be updated by using the latest feature vector.

In step 355, method 300 determines if a state should be deleted. States can be deleted, for example, if a camera is turned off or if the lights are turned off in a room such that the camera no longer has adequate light to create a distinguishable image. In these cases, the original state will likely be deleted. In the latter instance, when the lights are turned off, a new state may be created and the old state deleted.

If a state should be deleted (step 355=YES), then the state is deleted in step 360. If a state should not be deleted (step 355=NO), then the method 300 ends.

It should be noted that, if HMMs are used in the present invention, the following reference, which is hereby incorporated by reference herein, describes adding and removing HMM states: Colmenarez and Gutta, "Method and Apparatus for Determining a Number of States for a Hidden Markov Model in a Signal Processing System," U.S. patent Ser. No. 09/706,668, filed Nov. 6, 2000. The techniques described in Colmenarez and Gutta may be used herein to add and remove HMM states.

It should be also noted that method 300 may be modified, if desired, to accommodate training. For example, clustering is often performed on training data, where both the feature vectors and classes associated with the vectors are known and entered into the system.

Referring now to FIG. 4, an exemplary state diagram 400 is shown that models camera views, in accordance with a preferred embodiment of the invention. State diagram 400 comprises three states 410, 420, and 430, and state transitions 416, 417, 418, 426, 427, 436, 438, and 439. If HMMs are used to model camera images, then state transitions 416, 417, 418, 426, 427, 436, 438, and 439 will be used. Generally, state transitions are not used for other schemes.

Each state transition models the probability of transferring to another state given that system is in the current state. In other words, the transition 416 models the probability of transferring from state 410 to state 410. Similarly, transition 417 models the probability of transferring from state 410 to state 420.

In the present invention, HMMs model not only the images coming from cameras but also how long a video multiplexer captures images from a particular camera and what the sequence by the video multiplexer is for selecting cameras.

Initially, state diagram 400 would generally contain no states. It is possible, however, for the state diagram 400 to start with a number of states equivalent to the number of cameras. The latter could occur if an operator configures the state diagram 400 with the appropriate number of states. Regardless of how the state diagram starts, the very first input image will generally be assigned to state 410. As time progresses, and images from different cameras are input, the probabilities for each state and each state transition will be determined. These types of analyses are well known to those skilled in the art. For instance, HMM analysis as applied to images is discussed in Colmenarez and Gutta, Tanguay, Lu, and Petkovic, each of which has been incorporated by reference above.

Figure 5:
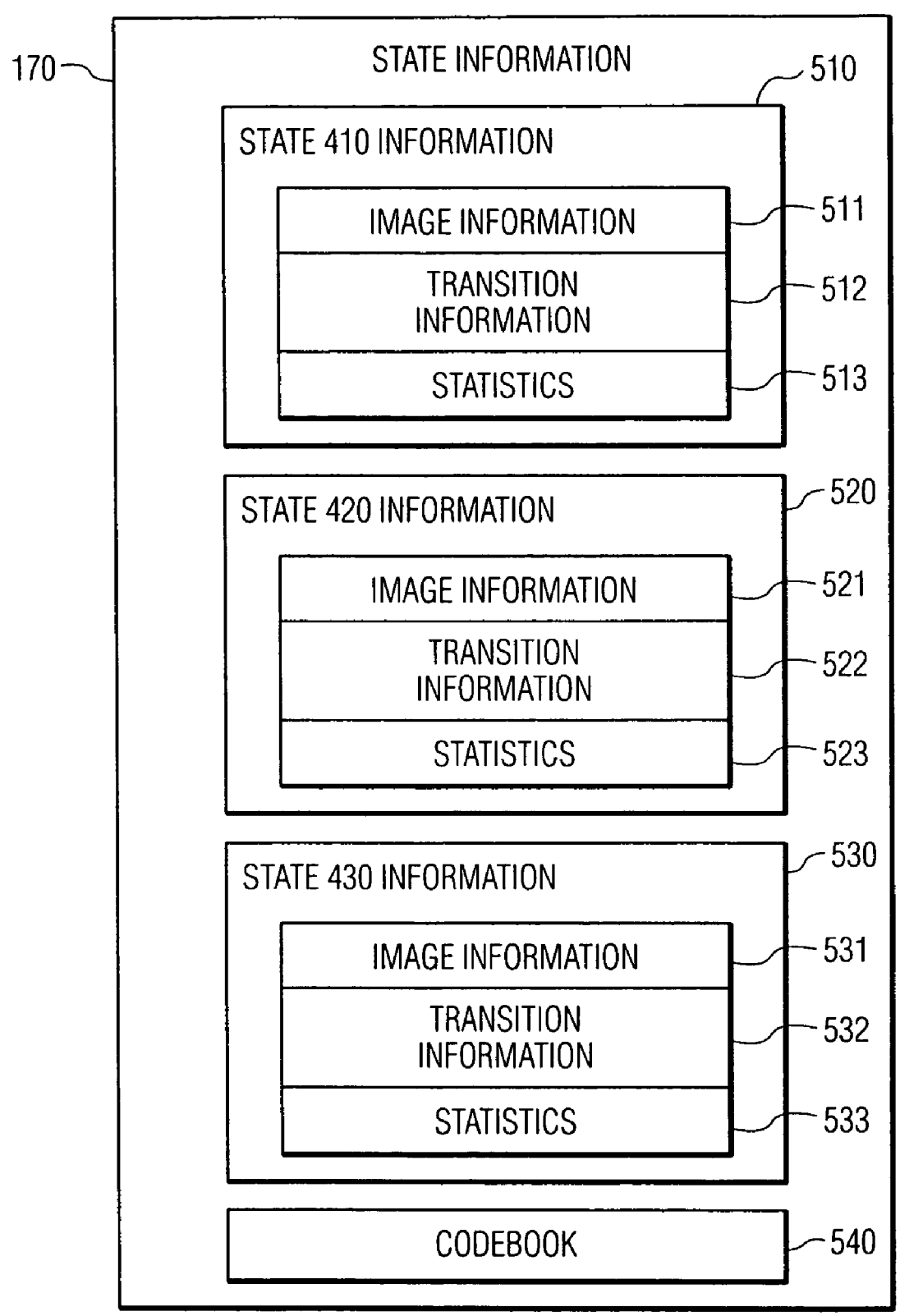
FIG. 5 is a block diagram of an exemplary state information memory area, in accordance with a preferred embodiment of the invention.

Referring now to FIG. 5, an exemplary state information memory area 170 is shown, in accordance with a preferred embodiment of the invention. The state information area 170 is shown being used to store data about HMM states. This exemplary state information area 170 comprises state information 510, 520, and 530 corresponding to states 410, 420, and 430, respectively, and codebook 540. Each state information 510, 520, and 530 comprises, respectfully, image information 511, 521, and 531, transition information 512, 522, and 532, and statistics 513, 523, and 533. Image information 511, 521, and 531 comprises information used to compare images. As described above, this information may comprise histograms, probability densities, cluster areas, feature vectors, or other information known to those skilled in the art. Transition information 512, 522, 532 comprises data about state transitions. For example, transition information 512 could comprise information about each of transitions 416, 417, and 418 (see FIG. 4), such as the state in which each transition ends, the number of times the transition has occurred, and the total number of transitions.

The statistics information 513, 523, and 533 comprises data about each state. For instance, statistics information 513 can comprise the number of times the state has occurred, the total number of states that have occurred, and the total number of states. As an illustration, there might be three states, of which state one has occurred 10 times and all states have occurred 30 times. The probability of having state one occur is one-third.

Codebook 540, as known to those skilled in the art, is a device that maps input image information, generally stored in the form of a vector, to one of the states of the HMM and provides probabilities for each state. Generally, the probabilities are derived from multidimensional Gaussian functions and are determined during training.

FIGS. 4 and 5 may be modified accordingly when using other types of image quantifying techniques, such as histogram methods or clustering.

It is to be understood that the embodiments and variations shown and described herein are merely illustrative of the principles of this invention and that various modifications may be implemented by those skilled in the art without departing from the scope and spirit of the invention.

What is claimed is:

1. A method comprising:
   determining an input image from a signal comprising images from a plurality of cameras;
   determining input image information from the input image;
   matching the input image with one of a plurality of states by comparing the input image information with state image information corresponding to each of at least one state; and
   assigning the input image to one of the states when the input image information matches the state image information of the one state,
   wherein the step of comparing comprises the sub-steps of:
   determining if at least one state exists; and
   adding a new state that corresponds to the input image when at least one state does not exist,
   and wherein the step of assigning comprises the step of:
   assigning the input image to the new state.

2. The method as claimed in claim 1, wherein
   the step of comparing comprises the step of:
   when the input image information does not match any of the information for each of the at least one states, adding a new state that corresponds to the input image, and wherein
   the step of assigning comprises the step of:
   assigning the input image to the new state.

3. The method as claimed in claim 1, wherein the at least one state comprises a plurality of states, and wherein the method further comprises the step of performing training to determine the plurality of states.

4. The method as claimed in claim 1, wherein said method further comprises the step of:
   outputting the input image, the input image output as being associated with the one state.

5. The method as claimed in claim 1, wherein the images on the signal are determined asynchronously.

6. The method as claimed in claim 5, wherein said method further comprises the step of:
   multiplexing the images onto the signal, the multiplexing step being performed wherein a sequence of switching between cameras is not predetermined.

7. The method as claimed in claim 1, wherein the images on the signal are determined synchronously.

8. The method as claimed in claim 1, wherein said method further comprising the steps of:
   outputting the input image, the step of outputting associating the input image with the one state;
   determining if an event is occurring on the input image, the step of determining comparing previous images associated with the one state with a present image.

9. The method as claimed in claim 1, wherein the input image information matches state image information of the one state when a metric comparing the input image information and the state image information of the one state falls within a predetermined value.

10. The method as claimed in claim 1, wherein:
the step of determining input image information from the input image comprises determining a histogram from the input image;
the step of comparing comprises comparing the histogram of the input image with histograms corresponding to each of at least one states; and
the step of assigning comprises assigning the input image to one of the states when the histogram of the input image matches the histogram of the one state within a predetermined error.

11. The method as claimed in claim 1, wherein:
the step of determining input image information from the input image comprises determining a plurality of features from the input image;
the step of comparing comprises comparing the features of the input image with each of a plurality of features corresponding to the at least one states; and
the step of assigning comprises assigning the input image to one of the states when the features of the input image match the features of the one state within a predetermined error.

12. The method as claimed in claim 11, wherein each of the states comprises a state of a Hidden Markov Model (HMM).

13. A system comprising:
a memory for storing computer readable code; and
a processor operatively coupled to said memory, said processor configured to implement said computer readable code, said computer readable code causing said processor to:
determine an input image from a signal comprising images from a plurality of cameras;
determine input image information from the input image;
compare the input image information with state image information corresponding to each of at least one states; and
assign the input image to one of the states when the input image information matches state image information of the one state,
wherein in the comparing step, the computer readable code causes the processor to:
determine if at least one state exists; and
add a new state that corresponds to the input image when at least one state does not exist,
and wherein the assigning step, the computer readable code causes the processor to:
assign the input image to the new state.

14. An article of manufacture comprising a computer readable medium having computer readable program code means embodied thereon, said computer readable program code being executable by a processor to performs acts comprising:
determining an input image from a signal comprising images from a plurality of cameras;
determining input image information from the input image;
comparing the input image information with state image information corresponding to each of at least one states; and
assigning the input image to one of the states when the input image information matches state image information of the one state,
wherein in the comparing step, the computer readable code causes the processor to:
determine if at least one state exists; and
add a new state that corresponds to the input image when at least one state does not exist,
and wherein the assigning step, the computer readable code causes the processor to:
assign the input image to the new state.

* * * * *